(12) United States Patent
Gausrab et al.

(10) Patent No.: US 10,626,990 B2
(45) Date of Patent: Apr. 21, 2020

(54) PARKING LOCK FOR AN AUTOMATIC TRANSMISSION AND METHOD FOR OPERATING THE PARKING LOCK

(71) Applicant: Dr. Ing. h.c. F. Porsche Aktiengesellschaft, Stuttgart (DE)

(72) Inventors: Klaus Gausrab, Tiefenbronn (DE); Arne Krüger, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 256 days.

(21) Appl. No.: 15/897,620

(22) Filed: Feb. 15, 2018

(65) Prior Publication Data

US 2018/0238448 A1    Aug. 23, 2018

(30) Foreign Application Priority Data

Feb. 17, 2017   (DE) ................. 10 2017 103 317

(51) Int. Cl.
*F16H 27/02* (2006.01)
*F16H 29/02* (2006.01)
(Continued)

(52) U.S. Cl.
CPC .......... *F16H 63/3491* (2013.01); *B60T 1/005* (2013.01); *F16D 63/006* (2013.01);
(Continued)

(58) Field of Classification Search
CPC ............... F16H 63/3491; F16H 19/001; F16H 2019/008; B60T 1/005
See application file for complete search history.

(56) References Cited

U.S. PATENT DOCUMENTS 6,688,448 B2   2/2004   Giefer et al.
7,845,248 B2   12/2010  Yoshiyama et al.
(Continued)

FOREIGN PATENT DOCUMENTS

CN   201588928 U   9/2010
CN   202349192 U   7/2012
(Continued)

OTHER PUBLICATIONS

German Search Report for German Application No. 10 2017 103 317.3, dated Nov. 3, 2017 with partial English translation, 7 Pages.
(Continued)

*Primary Examiner* — Jake Cook
(74) *Attorney, Agent, or Firm* — RatnerPrestia

(57) ABSTRACT

In a parking lock for an automatic transmission, an electrical parking lock actuator has an electric motor, a spur gear stage driveable by the electric motor, and a worm gear stage driveable by the spur gear stage. A worm shaft of the worm gear stage is connected rotationally conjointly to an output gear of the spur gear stage, and a worm gear of the worm gear stage is connected rotationally conjointly to a transmission-side parking lock shaft. The worm shaft is fixed in an axially displaceable manner in the output gear. A stop limits the pivoting movement of the worm gear when a parking lock position of the parking lock shaft is reached. A spring braces the worm shaft in an axial direction of the worm shaft against a holding mechanism which is situated in a stop position, in which the holding mechanism is fixed by an electrically energized electromagnet.

10 Claims, 5 Drawing Sheets

(51) Int. Cl.
*F16H 29/20* (2006.01)
*F16H 63/34* (2006.01)
*F16H 19/00* (2006.01)
*B60T 1/00* (2006.01)
*F16D 63/00* (2006.01)

(52) U.S. Cl.
CPC ....... *F16H 19/001* (2013.01); *F16H 63/3466* (2013.01); *F16H 2019/008* (2013.01)

(56) References Cited

U.S. PATENT DOCUMENTS

| | | | |
|---|---|---|---|
| 7,966,903 | B2 | 6/2011 | Kimura et al. |
| 9,327,700 | B2 | 5/2016 | Yoon |
| 2008/0302628 | A1 | 12/2008 | Kimura et al. |
| 2011/0186400 | A1* | 8/2011 | Villeneuve ............. B60T 1/005 192/219.5 |
| 2017/0130839 | A1* | 5/2017 | Takei .................. F16H 63/3425 |

FOREIGN PATENT DOCUMENTS

| | | |
|---|---|---|
| CN | 104334936 A | 2/2015 |
| CN | 104421426 A | 3/2015 |
| DE | 4447512 A1 | 5/1996 |
| DE | 10015782 A1 | 1/2002 |
| DE | 102007000426 A1 | 2/2008 |
| DE | 102008001976 A1 | 12/2008 |
| DE | 102008036971 B3 | 10/2009 |
| DE | 102012012672 A1 | 1/2013 |
| DE | 102014219039 A1 | 3/2016 |
| EP | 1228328 B1 | 1/2006 |

OTHER PUBLICATIONS

Chinese Office Action for Chinese Application No. 201810095740.6, dated Jun. 13, 2019, with translation, 12 pages.
Chinese Office Action for Chinese Application No. 201810095740.6, dated Dec. 27, 2019, with translation, 10 pages.

* cited by examiner

PARKING LOCK FOR AN AUTOMATIC TRANSMISSION AND METHOD FOR OPERATING THE PARKING LOCK

CROSS-REFERENCE TO RELATED APPLICATIONS

This application claims priority to German Patent Application No. DE 10 2017 103 317.3, filed Feb. 17, 2017, which is incorporated by reference herein in its entirety.

FIELD OF THE INVENTION

The invention relates to a parking lock for an automatic transmission, and to a method for operating a parking lock of said type.

BACKGROUND OF THE INVENTION

The majority of automatic transmissions of motor vehicles available on the market have a parking lock which is mechanically actuated by means of a cable pull connected to a selector lever. New developments provide, in some cases, an electrohydraulic or electromotive actuation means, which is actuated electrically by the selector lever. This is known as full shift by wire function. If a vehicle is equipped with a fully automatic parking function, in which the driver may even be situated outside the vehicle during the parking process, the vehicle must automatically engage the parking lock. This is only possible with a transmission with full shift by wire function.

To avoid new development, or in the case of low equipment rates of the full shift by wire function, and in the case of an approach strongly geared towards using identical parts to form the base transmission, use is made of electromotive parking lock actuators situated outside the transmission. Actuator shift modules are known which are bolted onto the outside of the transmission and which are connected directly to a parking lock shaft of the transmission, and actuator shift modules are known which are fastened to the transmission or to the vehicle and which actuate the parking lock lever via a cable pull.

The vehicle must be capable of being securely parked, on all roadway gradients, even in the event of a failure of the on-board electrical system. Vehicles with an electric parking brake and an electric parking lock actuator therefore require either a second redundant electrical supply or a device which automatically engages the parking lock in this situation.

A parking lock for an automatic transmission, wherein the parking lock is actuable by means of an electric parking lock actuator, wherein the parking lock actuator has an electric motor, a spur gear stage which is driveable by means of the electric motor, and a worm gear stage which is driveable by means of the spur gear stage, wherein a worm shaft of the worm gear stage is connected rotationally conjointly to an output gear of the spur gear stage, and a worm gear of the worm gear stage is connected rotationally conjointly to a transmission-side parking lock shaft, is known from practice. Said electric parking lock actuator is bolted onto the transmission and is used in a purely electrically operated passenger motor vehicle (BMW i3). Said parking lock actuator is not equipped with a fail-safe function, because a redundant electrical supply is already available in electric vehicles.

EP 1 228 328 B1, which is incorporated by reference herein, discloses a transmission actuator arrangement with an electromagnetic clutch which, in the event of an electrical failure, is decoupled only by means of a spring element, and thus the shift position "P" of the transmission and the parking lock is engaged.

SUMMARY OF THE INVENTION

Described herein is a parking lock known from practice such that the parking lock function is reliably activated in the event of an electrical failure, in particular a failure of the on-board electrical system of the vehicle. This should be ensured in the case of a compact design of the parking lock. Also described is art advantageous method for operating a parking lock said type.

In the case of the parking lock according to aspects of the invention, the worm shaft is fixed in an axially displaceable manner in the output gear. A stop limits the pivoting movement of the worm gear when a parking lock position of the parking lock shaft is reached. A spring braces the worm shaft in an axial direction of the worm shaft against a holding means which is situated in a stop position, in which the holding means is fixed by means of an electrically energized electromagnet. When the parking lock shaft is situated in a non-parking lock position, and when the holding means is not held in the initial position by the electromagnet as a result of the latter being electrically deenergized, the worm shaft is displaced in an axial direction under the action of the spring and pivots the worm gear into its stop position.

Thus, if the electrical supply of the vehicle, that is to say the on-board electrical system, fails in the switching position of the non-parking lock position, the electromagnet is no longer electrically energized. The spring moves the worm shaft axially against the stop, in particular a housing stop, and thus rotates the worm gear into the switching position of the parking lock position, without the worm shaft, the spur gear stage and the electric motor rotating in the process. The parking lock is thus automatically engaged in the electrically deenergized state of the vehicle. In the case of such a parking lock actuator, a redundant electrical supply is not required for this operating situation.

The worm gear is in particular positioned such that, in the non-parking lock position, it is positioned so as to face toward the spur gear stage, and in the parking lock position, it is positioned so as to face toward the spring. Here, the spring acts via the worm shaft on the worm gear such that, in the event of an electrical failure, the worm shaft, and thus also the worm gear are moved away from the spur gear stage.

The holding means is preferably formed as a holding lever. The latter is mounted so as to be pivotable about a static axle. One lever arm of the holding lever can be placed into an operative position with the electromagnet, and the other lever arm of the holding lever can be placed in operative connection with the worm shaft. When the electromagnet is electrically energized, it holds the holding lever, whereby the holding lever does not pivot but rather remains in said position and thus forms the counterbearing for the axially displaceable worm shaft. In the electrically deenergized state of the electromagnet, this function of the counterbearing is eliminated in that the holding lever pivots away from the electromagnet under the action of the spring, and thus, likewise under the action of the spring, the pivot shaft is displaced axially, with the worm gear which meshes with the worm shaft simultaneously being pivoted, with the parking lock shaft connected to the worm gear being transferred into its parking lock position.

In a preferred refinement of the invention, it is provided that the worm shaft receives, axially fixed therein, a holding bracket which makes contact with the holding means situated in the stop position. By means of said holding bracket, the forces can be transmitted in an optimum manner between the latter and the holding means, specifically the holding lever.

The holding means is preferably preloaded under the action of a further spring against the electromagnet. In particular, one lever arm is preloaded against the electromagnet. If the electromagnet is electrically deenergized and is pivoted under the action of the worm-gear-side spring, said further spring has the effect, when such a pivoting-out force no longer acts on the, holding means, that the holding means is pivoted back against the electromagnet again.

In the method according to aspects of the invention for operating the parking lock, it is provided that, during the disengagement of the parking lock, the electric motor rotates the worm shaft, which is supported via the holding means on the electromagnet, in a forward direction of rotation when the electromagnet is electrically energized. The statement "in a forward direction of rotation" is to be understood to mean that the worm shaft is rotated in a first axial direction. By contrast, during the engagement of the parking lock, the electric motor rotates the worm shaft, which is supported on the output gear of the spur gear stage, in a backward direction of rotation, and therefore in the axial direction opposite to the direction of rotation during the disengagement. In the case of an electrical failure and thus an electrically deenergized electromagnet and interrupted action on the holding means, and when the parking lock is disengaged, the worm shaft is displaced axially under the action of the spring, with the worm gear simultaneously being pivoted in order to engage the parking lock.

In accordance with the force conditions to be implemented between holding means and electromagnet in the respective method steps, said electromagnet is preferably electrically energized to different extents. Accordingly, during the disengagement of the parking lock, it is provided that the electromagnet is electrically energized to a maximum extent. When the parking lock is disengaged, it is provided that the electric motor is electrically energized to a reduced extent. During the engagement of the parking lock, it is provided that the electromagnet is electrically energized to a reduced extent.

Following a failure of the on-board electrical system and an axial displacement of the worm shaft in order to attain the parking lock position, it is provided in particular that a reset function be implemented in the event of a renewed supply of electricity. Here, by means of the electric motor, the worm shaft is rotated backward, such that the worm shaft moves in the direction of the output gear into its initial position. By means of the further spring, the holding means is moved against the electromagnet, and the electromagnet is electrically energized particular electrically energized to a reduced extent.

BRIEF DESCRIPTION OF THE DRAWINGS

Further features of the invention will emerge from the claims, from the appended drawing and from the description of the preferred exemplary embodiment depicted in the drawing, without the invention being restricted thereto.

In the drawing.

DETAILED DESCRIPTION OF THE INVENTION

Figure 1:
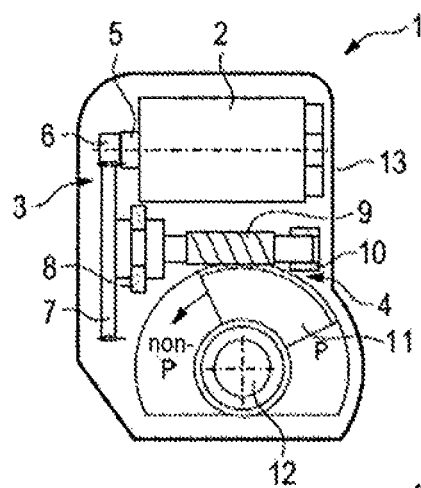
FIG. 1 shows, in a schematic illustration, a parking lock for an automatic transmission, which has a parking lock actuator according to the prior art known from practice.

The parking lock according to the prior art shown in FIG. 1 is used in an automatic transmission. The parking lock is actuable by means of an electric parking lock actuator 1. Said parking lock actuator has an electric motor 2, a spur gear stage 3 which is driveable by means of the electric motor 2, and a worm gear stage 4 which is driveable by means of the spur gear stage 3. The spur gear stage 3 has a pinion 6 connected to an output shaft 5 and has an output gear—spur gear 7—which meshes with the pinion 6. The spur gear 7 is axially fixed in a bearing 8 and is fixedly connected to a worm shaft 9 of the spur gear stage 4. In the region of the end averted from the bearing 8, the worm shaft 9 is mounted in a further bearing 10 which is fixed with respect to a housing. The worm shaft 9 meshes with a worm gear 11 of the worm gear stage 4, which extends over a quarter circle. The worm gear 11 is connected rotationally conjointly to a parking lock shaft 12 of the automatic transmission.

The described parts of the parking lock actuator 1 are arranged within a housing 13. Within this, the worm gear 11 and thus the parking lock shaft 12 fixedly connected thereto are pivotable between the illustrated parking lock position P and a non-parking lock position "non-P", wherein, to attain the latter position, the worm gear 11 is pivoted through an angle of approximately 25° counterclockwise from the position "P". Said pivoting is performed exclusively under the action of the electric motor 2 in one or the other direction of rotation of its rotor.

Figure 2:
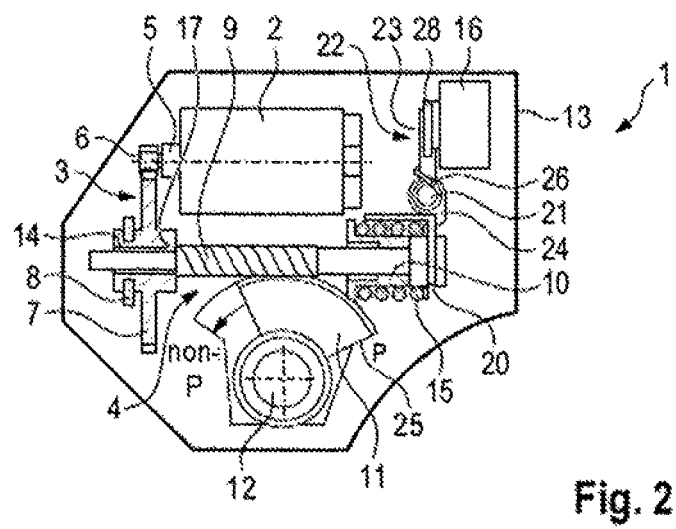
FIG. 2 shows, in a schematic illustration, a parking lock for an automatic, transmission, which has a parking lock actuator according to aspects of the invention.
Figure 3:
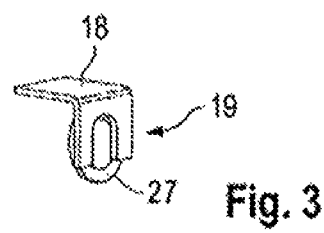
FIG. 3 shows a detail of the parking lock actuator shown in FIG. 2, FIGS. 4-10 show different operating states of the parking lock actuator according to aspects of the invention shown in FIG. 2.

With regard to the parking lock actuator 1 according to aspects of the invention as per the illustration in FIG. 2, reference is firstly made, in order to avoid repetitions, to the description of the actuator as per the prior art in FIG. 1; differences will emerge from the following description: The parking lock actuator 1 according to aspects of the invention differs from the parking lock actuator 1 known from the prior art as per FIG. 1 in that the worm shaft 9 is mounted in, an axially displaceable manner in the spur gear 7 by means is of a driver toothing 14 between spur gear 7 and worm shaft 9. The worm shaft 9 is thus coupled rotationally conjointly, and displaceably in the direction of the axis of rotation, to the spur gear 7 of the spur gear stage 3. It is furthermore provided that the worm shaft 9 is acted on by spring force, specifically the force of a spring 15 which is illustrated in FIG. 2 and which is in the form of a helical spring, in an axial direction away from the spur gear stage 3. The spring 15 is supported on the housing 13 and, in the "non-P" switching position, is held in a prestressed state by an electromagnet 16 and by a mechanical device to be described in more detail below. In the event of a failure of the electrical supply of the electromagnet 16 in the "non-P" switching position, the worm shaft 9 is displaced axially by the spring 15 and rotates the worm gear 11, and the parking lock shaft 12 connected rotationally conjointly thereto, into the "P" switching position. As a result of backward rotation of the worm shaft 9 from the emergency switching position, the normal position of the parking lock actuator 1 is attained again.

During normal operation, switching between the switching positions "P" and "non-P" ("R" in most gearboxes) is performed by virtue of the electric motor 2 rotating the parking lock shaft 12 via the spur gear stage 3 and the worm gear stage 4. The overall transmission ratio between the electric motor 2 and the parking lock shaft 12 amounts to 115, for example. The worm shaft 9 and the spur gear 7 are connected to one another rotationally conjointly, and so as to be displaceable relative to one another in the direction of the axis of rotation, by means of the driver toothing 14. The spur gear 7 is mounted rotatably in a bearing 8 which is fixed with respect to a housing. The worm shaft 9 is supported, by means of a shaft shoulder 17, axially in one direction on the spur gear 7 and in the other direction on a holding bracket 18 which engages with a U-shaped profile 19 into a groove 20 of the worm shaft 9. The holding bracket 18 is held in its position, and is prevented from rotating, by means of a holding lever 22 which is mounted in the housing 13 so as to be rotatable about an axis 21. The holding lever 22 is held in its position by an electromagnet 16 which is fixed in the housing 13. By means of a lever ratio at the holding lever 22, which has a long, electromagnet-side lever arm 23 and a short, holding-bracket-side lever arm 24, axial forces that act on the worm shaft 9 as reaction forces from the worm toothing only have to be held in reduced form by the electromagnet 16.

The spring 15 axially fixed in the bearing 10 acts permanently on the holding bracket 18 and, during fault-free, operation, remains permanently inactive in said position. The axial forces of the spring 15 are likewise supported by means of the electromagnet 16. When the vehicle is parked and the electromagnet 16 is electrically deenergized, the worm gear 11 is situated in the switching position P and bears against a housing stop 25. This prevents axial forces of the spring 15 from axially moving the worm shaft 9. The self-locking action of the high transmission ratio also prevents axial forces of the spring 15 from leading to an undesired rotation of the electric motor 2. A further spring 26 which is arranged on the rotary axle 21 of the holding lever 22 and which is in the form of a leg spring ensures that the holding lever 22 bears in a defined manner against the electromagnet 16 even in the electrically deenergized state.

If the on-board electrical system fails in the switching position "non-P", the electromagnet 16 is no longer electrically energized. The spring 15 moves the worm shaft 9 axially as far as the housing stop 25, and rotates the worm gear 11 into the switching position "P", without the worm shaft 9, the spur gear stage 3 and the electric motor 2 rotating in the process. The parking lock is thus automatically engaged in the electrically deenergized state of the vehicle. In the case of this parking lock actuator 1, a redundant electrical supply is thus not required for this operating situation.

In the exemplary embodiment according to aspects of the invention, the worm gear 11 has a stop 25 in the housing 13 in the "P" position. The spring 15 transmits the force via a disk 27 and the U-shaped holding bracket 18 to the worm shaft 9. The holding bracket 18 transmits the force in a groove 20 of the worm shaft 9. The holding bracket 18 extends in a longitudinal direction over the spring 15 at least over a length of the actuation stroke of the spring 15. The holding lever 22 is mounted rotatably in the housing 13 and, in the normal position, prevents the actuation stroke. The holding lever 22 is held in the normal position by the electromagnet 16. In particular, the holding lever 22 is composed of plastic with a clipped-in steel disk 28 for the purposes of interacting with the electromagnet 16.

The electrically actuable parking lock actuator 1 is bolted as a switching module to the outside of the transmission. The electric motor 2 rotates the parking lock shaft 12, which projects out of the transmission, with a high self-locking overall transmission ratio by means of the spur gear stage 3 and the worm gear stage 4. A motor control unit is preferably integrated in the actuator housing.

FIGS. 4 to 10 show the individual operating states and switching positions and illustrate the functioning of the parking lock actuator 1 according to aspects of the invention.

Figure 4:
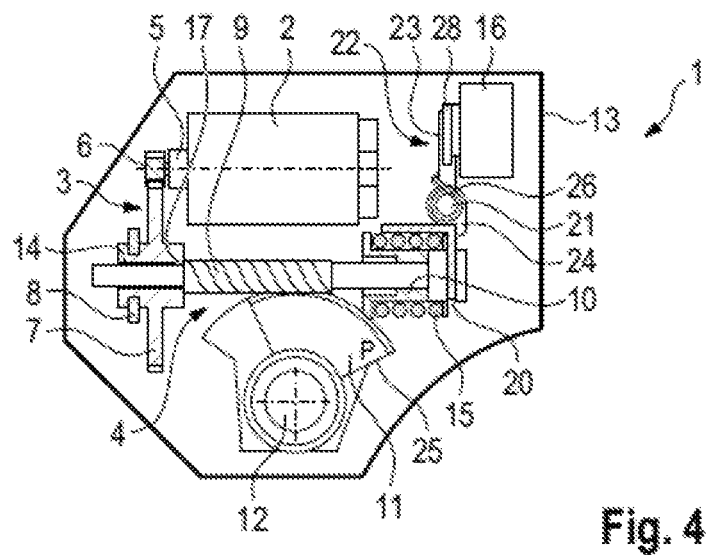

FIG. 4 shows the operating state in the case of a parked vehicle and switched-off ignition. Here, the parking lock is engaged, and the electromagnet 15 is electrically deenergized. The spring 15 is held in position by the worm shaft 9, which is in a self-locking state. The worm shaft 9 is held axially by the worm gear 11. The worm gear 11 bears against the stop 25.

Figure 5:
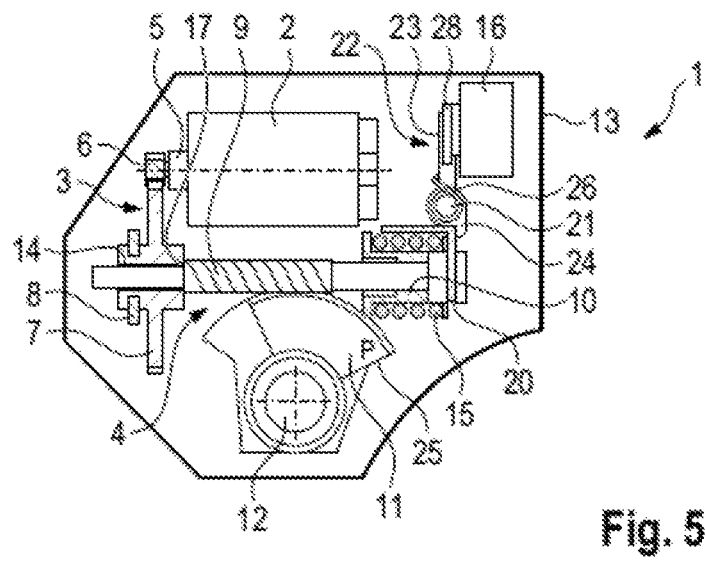

FIG. 5 shows the operating state of the switched-on ignition. Here, the electromagnet 16 is electrically energized. Since neither switching forces nor spring forces act on the holding lever 22 in this switching position, it is possible, with corresponding actuation, for electrical energization to be performed with reduced power. The worm shaft 9 is held axially by the worm gear 11. The worm gear 11 bears against the stop 25.

Figure 6:
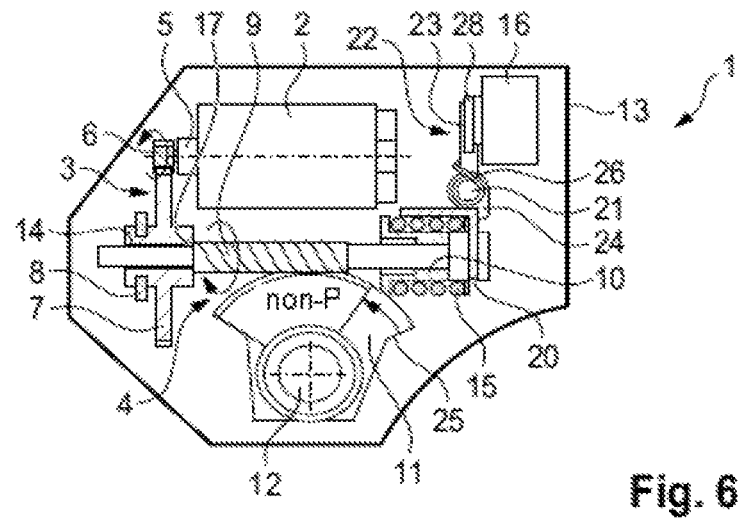

FIG. 6 shows the operating state of the disengagement of the parking lock. The electric motor 2 is energized, and the worm shaft 2 rotates the worm gear 11 into the switching position "non-P". For this purpose, the electromagnet 16 is energized with full power. The spring force of the spring 15 and the reaction forces on the worm toothing are supported on the electromagnet 16 via the holding lever 22. When the electric motor 2 is actuated, the worm shaft 9 rotates in a forward direction of rotation. The pivoting of the worm gear 11 is performed from the "P" position into the "non-P" position through an angle of approximately 25°.

Figure 7:
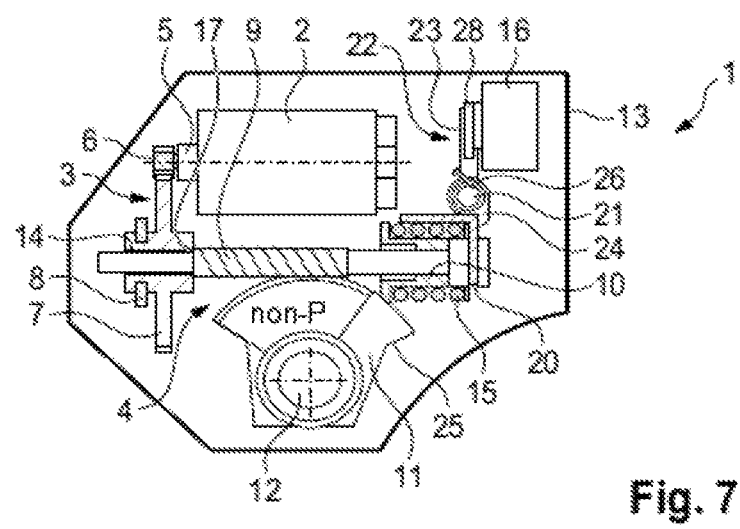

FIG. 7 shows the operating state of the disengaged parking lock. Here, the worm gear 9 is situated in the switching position "non-P", in which it has been rotated through approximately 25°, and is not in contact with the rear housing stop. The electromagnet 16 only has to impart a holding force that counteracts the spring force of the spring 15. To reduce the power losses, actuation with reduced power is possible.

Figure 8:
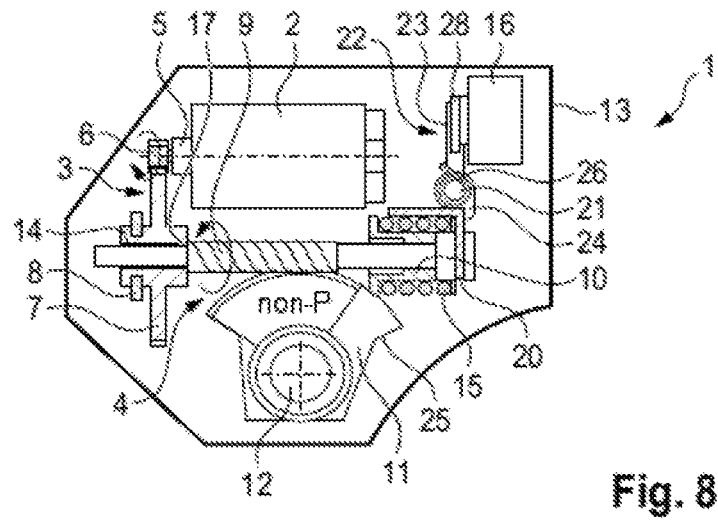

FIG. 8 shows the operating state of the engagement of the parking lock. Here, the electric motor 2 is actuated in the backward direction of rotation, and rotates the worm gear 11 into the switching position "P". The worm shaft 9 is supported, by means of its shaft shoulder 17, axially on the spur gear 7. The electromagnet 16 likewise supports only the switching spring force. Here, too, actuation of the electromagnet 16 is possible with reduced power.

Figure 9:
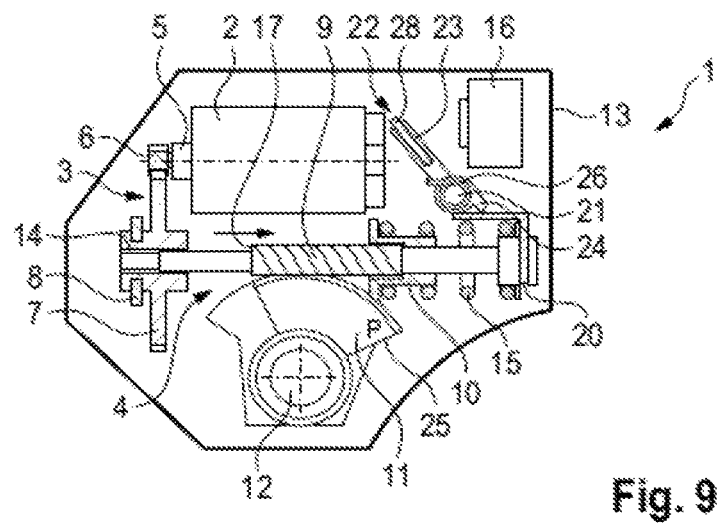

FIG. 9 shows the operating state of a failure of the on-board electrical system. If the on-board electrical system fails when the parking lock is disengaged, the electromagnet 16 is no longer electrically energized. The spring 15 is not subjected to any holding force by the holding lever 22, and, via the holding bracket 18, moves the worm shaft 9 in an axial direction such that the worm gear 11 rotates as far as the housing stop 25 of the switching position "P". No rotation of worm shaft 9, spur gear stage 3 and electric motor 2 occur here. The parking lock is automatically engaged in the electrically deenergized state of the vehicle. The holding lever 22 is moved into a tilted position owing to the displaced position of the holding bracket 18, and is held in said position owing to the design of the holding bracket 18, which extends over the spring 15.

Figure 10:
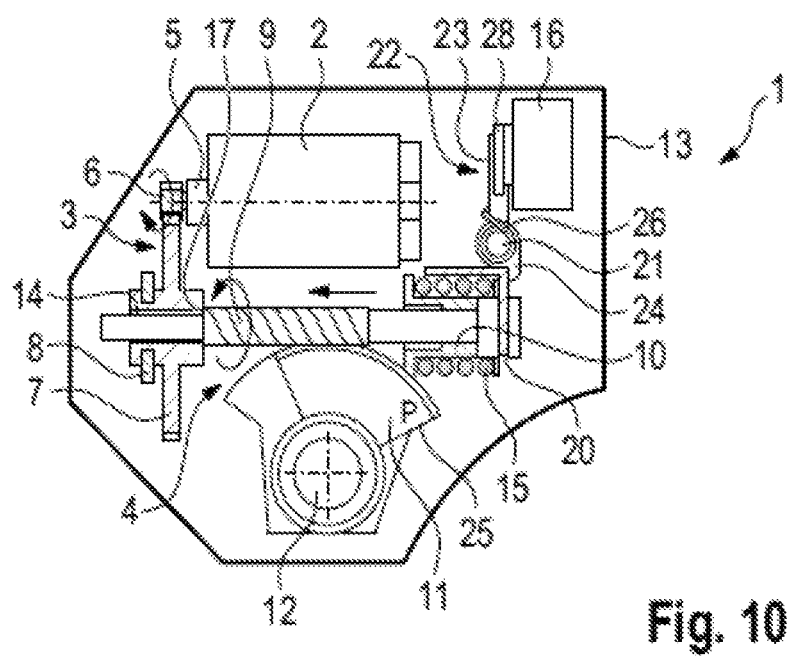

Such a mechanical fail-safe switching position is detected by means of position sensors on the worm shaft 9. If, after said switching process, an energy source provides a supply to the on-board electrical system again, the actuation of the electric motor 2 initially performs a reset operation, which is illustrated in FIG. 10, in order to restore the initial state of the parking lock actuator 1. For this purpose, the electric motor 2 rotates the worm shaft 9 backward until the worm shaft 9 reassumes its initial position for abutment against the spur gear 7. The spring 15 is stressed again. Here, the worm gear 11 remains in the switching position "P". The holding lever 22 is, by means of the further spring 26, rotated with the steel disk 28 for abutment against the electromagnet 16. The initial state of the parking lock actuator 1 is thus restored with full functionality.

LIST OF REFERENCE DESIGNATIONS

1 Parking lock, actuator
2 Electric motor
3 Spur gear stage
4 Worm gear stage
5 Output shaft
6 Pinion
7 Spur gear
8 Bearing
9 Worm shaft
10 Bearing
11 Worm gear
12 Parking lock shaft
13 Housing
14 Driver toothing
15 Spring
16 Electromagnet
17 Shaft shoulder
18 Holding bracket
19 U-shaped profile
20 Groove
21 Axle
22 Holding lever
23 Lever arm
24 Lever arm
25 Housing stop
26 Spring
27 Disk
28 Steel disk

What is claimed is:

1. A parking lock for an automatic transmission,
the parking lock being actuable by an electric parking lock actuator having an electric motor,
a spur gear stage being driveable by the electric motor,
a worm gear stage being driveable by the spur gear stage,
a worm shaft of the worm gear stage is connected rotationally conjointly to an output gear of the spur gear stage, and a worm gear of the worm gear stage is connected rotationally conjointly to a transmission-side parking lock shaft,
the worm shaft is coupled in an axially displaceable manner in the output gear,
a stop limits the pivoting movement of the worm gear when a parking lock position of the parking lock shaft is reached,
a spring braces the worm shaft in an axial direction of the worm shaft against a holding means which is situated in a holding means stop position, in which the holding means is fixed by an electrically energized electromagnet,
when the parking lock shaft is situated in a non-parking lock position, and when the holding means is not held in the holding means stop position by the electromagnet as a result of the electromagnet being electrically deenergized, the worm shaft is configured to be displaced in an axial direction under the action of the spring to pivot the worm gear into a worm gear stop position.

2. The parking lock as claimed in claim 1, wherein the spur gear stage has a pinion and the output gear, the pinion being connected to an output shaft of the electric motor, wherein the output gear of the spur gear stage has a driver toothing for the worm shaft.

3. The parking lock as claimed in claim 1, wherein the worm shaft is configured to hold the spring in position, as a result of a self-locking action, when the electromagnet is electrically deenergized.

4. The parking lock as claimed in claim 1, wherein the worm gear extends over a part of either a circle or a quarter circle.

5. The parking lock as claimed in claim 1, wherein, in the non-parking lock position, the worm gear is positioned so as to face toward the spur gear stage, and in the parking lock position, said worm gear is positioned so as to face toward the spring.

6. The parking lock as claimed in claim 1, wherein the holding means is a holding lever which is mounted so as to be pivotable about a static axle, wherein one lever arm of the holding lever can be placed into an operative position with the electromagnet, and another lever arm of the holding lever is configured to be placed in operative connection with the worm shaft.

7. The parking lock as claimed in claim 6, wherein the worm shaft receives, axially fixed therein, a holding bracket which makes contact with the holding means situated in the holding means stop position.

8. The parking lock as claimed in claim 7, wherein the spring is supported with one end on a positionally fixed stop and with another end on the holding bracket or on a disk which bears against the holding bracket.

9. The parking lock as claimed in claim 6, wherein the holding means is at least partially of magnetic form at the electromagnet side, and the holding means receives a steel disk in the region of said one lever arm.

10. The parking lock as claimed in claim 6, wherein the holding means is preloaded under the action of a further spring against the electromagnet, and said one lever arm s preloaded against the electromagnet.

* * * * *